United States Patent
Rosine et al.

(10) Patent No.: US 6,876,802 B2
(45) Date of Patent: Apr. 5, 2005

(54) MICROCHANNEL PLATE HAVING MICROCHANNELS WITH DEEP FUNNELED AND/OR STEP FUNNELED OPENINGS AND METHOD OF MANUFACTURING SAME

(75) Inventors: Steven David Rosine, Roanoke, VA (US); Nelson Christopher DeVoe, Roanoke, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 158 days.

(21) Appl. No.: 10/304,270

(22) Filed: Nov. 26, 2002

(65) Prior Publication Data

US 2004/0101261 A1 May 27, 2004

(51) Int. Cl.⁷ .............................. H01J 9/12; H01J 43/24
(52) U.S. Cl. ........... 385/120; 313/103 R; 313/103 CM; 313/377
(58) Field of Search ..................... 313/103 R, 105 CM, 313/376, 377; 385/43, 115, 116, 120, 121

(56) References Cited

U.S. PATENT DOCUMENTS

| 3,634,712 A | | 1/1972 | Orthuber | |
|---|---|---|---|---|
| 5,565,729 A | * | 10/1996 | Faris et al. | 313/103 CM |
| 5,776,538 A | * | 7/1998 | Pierle et al. | 427/78 |
| 6,311,001 B1 | | 10/2001 | Rosine | |
| 2004/0032193 A1 | | 2/2004 | Batista et al. | |

FOREIGN PATENT DOCUMENTS

JP     01-239749     9/1989

OTHER PUBLICATIONS

International Search Report, Appln. No. PCT/US 03/37197 dated Aug. 9, 2004.

* cited by examiner

Primary Examiner—Rodney Bovernick
Assistant Examiner—Omar Rojas
(74) Attorney, Agent, or Firm—RatnerPrestia (57) ABSTRACT

The invention includes a microchannel plate for an image intensifier tube, in which the plate has multiple microchannels extending in a longitudinal dimension between transverse surfaces of the plate. Each microchannel includes a first portion forming a first opening at an end proximate a surface of the plate. The first portion includes a wall extending longitudinally from the surface and terminating in a substantially similar first opening at a distal end. The microchannel also includes a second portion of the wall, extending longitudinally from the first opening at the distal end and tapering toward a second opening at a further distal end. The first opening at the proximate end has a diameter that is substantially similar to a diameter of the first opening at the distal end. The first opening is also wider than the second opening.

11 Claims, 6 Drawing Sheets

PRIOR ART

MICROCHANNEL PLATE HAVING MICROCHANNELS WITH DEEP FUNNELED AND/OR STEP FUNNELED OPENINGS AND METHOD OF MANUFACTURING SAME

FIELD OF THE INVENTION

This invention relates, in general, to microchannel plates for use in image intensifier tubes, and in particular, to a microchannel plate having microchannels with deep funneled openings and/or step funneled openings.

BACKGROUND OF THE INVENTION

Image intensifier tubes are used in night/low light vision applications to amplify ambient light into a useful image. A typical image intensifier tube is a vacuum device, roughly cylindrical in shape, and generally includes a body, photocathode and faceplate, microchannel plate (MCP), and output optic and phosphor screen. Incoming photons are focused on the glass faceplate by external optics, and strike the photocathode that is bonded to the inside surface of the faceplate. The photocathode converts the photons to electrons, which are accelerated toward the MCP by an electric field. The MCP has many microchannels, each of which functions as an independent electron amplifier, and roughly corresponds to a pixel of a CRT. The amplified electron stream, emanating from the MCP, excites the phosphor screen and a resulting visible image is passed through output optics to any additional external optics. The body holds these components in precise alignment, provides electrical connections, and also forms a vacuum envelope.

Microchannel plates are formed from a fusion of a large number of glass fibers, each having an acid etchable core and acid-resistant cladding. The fusion forms a solid rod or boule. Individual plates are sliced transversely from the boule, polished and chemically etched. The MCP is subjected first to a hydrochloric acid bath that removes the acid etchable core rod (decore), followed by a hot sodium hydroxide bath that removes mobile alkali metal ions from the cladding. The MCP is then activated in a reducing atmosphere and prepared for insertion into the image tube.

A microchannel plate includes many microchannels that are typically cylindrical in shape and are inclined 0–20 degrees from normal to the MCP surface. The ratio of the combined channel area to the overall active area of the MCP is known as an open-area ratio (OAR). The ratio of the core rod area to overall area prior to acid etching is approximately 45%. Acid etching of the MCP removes the rod core (decore) and realizes this 45% OAR. The sodium hydroxide leach step further increases the OAR to approximately 60%.

A conventional MCP typically has a degraded output image. That is, the output image is not a perfect replica of the input image. Degradation of the output image is caused by a number of factors. For example, an image intensifier tube has a maximum resolution determined by the spacing of the microchannels in the MCP, and the separation distance between various components of the image intensifier tube. A net effect is a slight out-of-focus condition that reduces a viewer's ability to discriminate detail of an image.

Stray electrons from a variety of sources other than the cathode and, which do not correspond to the input image, may also enter the microchannel plate and be amplified. The amplification factor for such spurious electrons is the same as the amplification factor for the image electrons, and results in image noise manifested as flickering points of light in the image.

Furthermore, an incident image electron may strike between two MCP channels and be reflected back toward the cathode. Such an electron may ultimately enter a MCP channel some distance from its point of origin. Such an electron may be amplified, but the resulting spot on the screen may not correspond to the input image. This effect is noticeable when the input image contains bright spots, and appears as a halo in the output image. Halo is affected by cathode-to-MCP spacing, and MCP channel geometry.

One solution for improving MCP characteristics is to increase the open-area ratio. Higher open-area ratios are desirable, but unfortunately, a MCP that has parallel surfaces is limited to an open-area ratio of approximately 65%, so that sufficient glass remains for structural integrity.

U.S. Pat. No. 6,311,001, issued Oct. 30, 2001 to Rosine, one of the inventors of the present invention, discloses a method of increasing the open-area ratio of a MCP, while maintaining its structural integrity by using funnel shaped channels. U.S. Pat. No. 6,311,001 is incorporated herein by reference in its entirety.

As described in the aforementioned patent, an improved MCP is formed from the fusion of multiple glass fibers into a solid rod, in which each fiber has an acid etchable core and acid-resistant cladding. Individual plates are then sliced transversely from the rod and polished. The MCP is then partially chemically etched with an alkaline material. The MCP is subjected next to an acid bath that removes the cores, followed by a hot strong alkali bath that removes additional acid resistant cladding from the glass. Microchannels having funnel shaped open ends are thereby formed in the MCP.

Figure 1A:
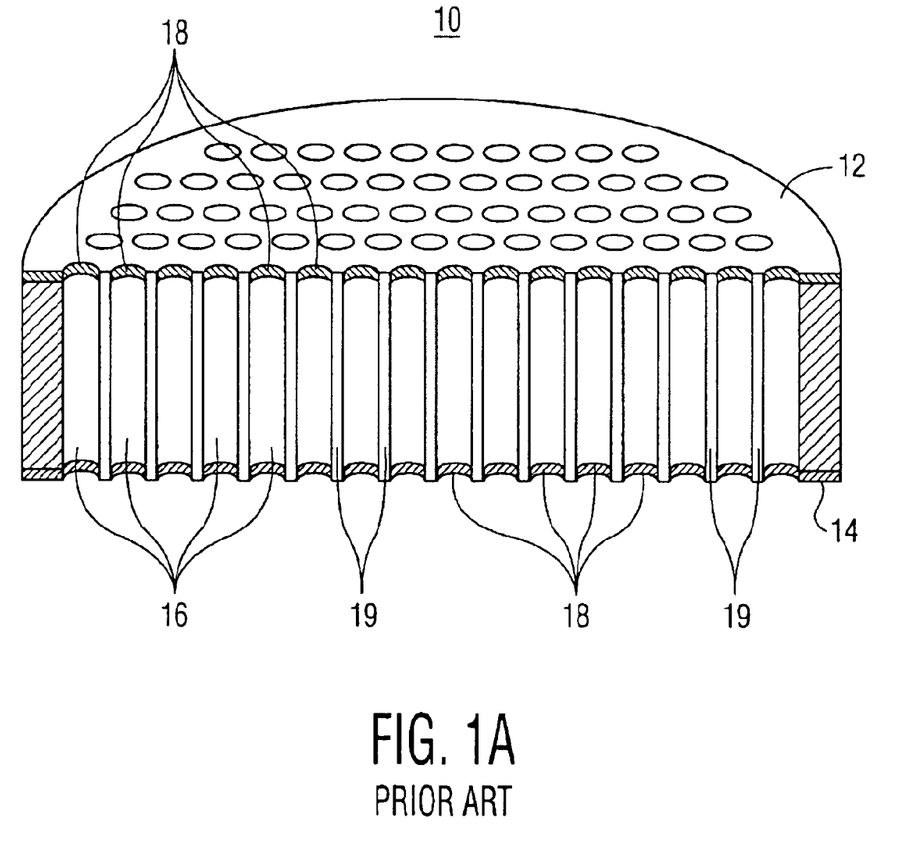
FIG. 1A is a sectional view of a conventional microchannel plate.

Referring to FIG. 1, which is similar to FIG. 1 of the aforementioned patent, there is shown a sectional view of MCP 10. As shown, MCP 10 includes input side 12, output side 14, and a plurality of microchannels 16, with funneled openings 18, extending between input and output sides 12, 14 thereof. The microchannel openings may be funneled only on input side 12 of MCP 10, only on output side 14 of MCP 10, or on both input and output sides of MCP 10 (as shown). Channel wall 19 has a tubular structure and forms each of the microchannels. Channel wall 19 also separates one microchannel from another microchannel.

Figure 2:
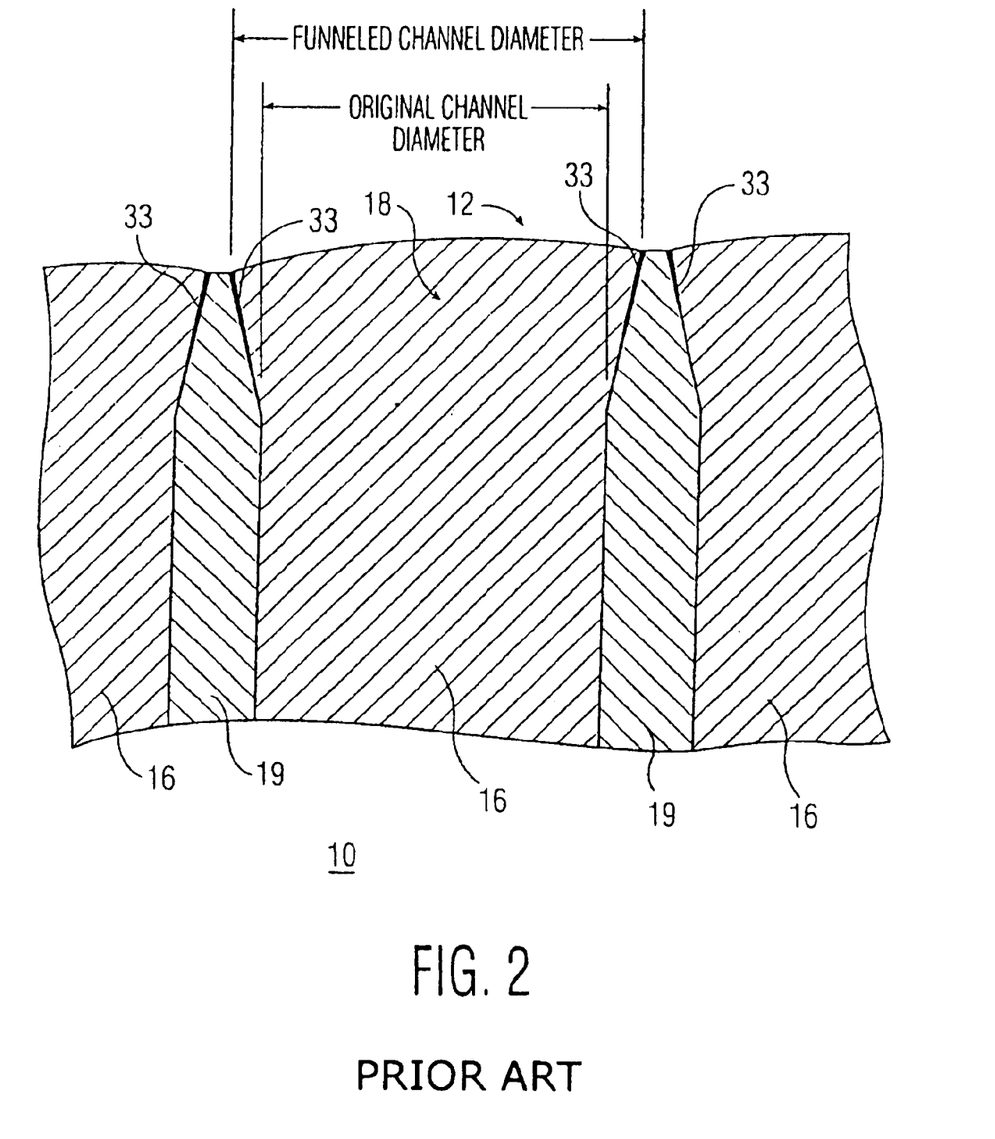
FIG. 2 is a sectional view of a portion of the microchannel plate of FIG. 1A illustrating metallization coverage on funneled regions of a wall forming a microchannel.

As best shown in FIG. 2, channel wall 19 includes a portion, or region, that diverges away from a longitudinal center of each microchannel 16 at input side 12 (output side 14 not shown) to form a funneled opening. Thus, as shown, funneled opening 18, at the input side, is larger in diameter than another portion of microchannel 16 that is deeper into MCP 10. The wall divergence, of funneling, generally occurs within one channel diameter from the MCP surface.

The inventors have noticed, however, that the region of funneled opening 18 is coated with metal 22 for purposes of electrical connection of the channel. Coated metal 22 tends to absorb incident electrons without production of secondary electrons. As a result of the metallic coating, the electron collection efficiency of the funneled channel is effectively neutralized. Reduction of input electron collection efficiency also reduces performance of the image intensifier tube by lowering its signal-to-noise ratio.

Accordingly, there remains a need for an improved MCP that overcomes the disadvantages caused by metallization of the funneled openings. This invention addresses that need.

SUMMARY OF THE INVENTION

To meet this and other needs, and in view of its purposes, the present invention provides an improved microchannel plate for an image intensifier tube. The microchannel plate includes multiple microchannels extending in a longitudinal dimension between transverse surfaces of the microchannel plate. Each microchannel includes a first portion forming a first opening, at an end proximate a surface of the microchannel plate. The first portion includes a wall extending longitudinally from the surface and terminating in a substantially similar first opening at a distal end. The microchannel also includes a second portion of the wall, extending longitudinally from the first opening at the distal end and tapering toward a second opening at a further distal end. The first opening at the proximate end has a diameter that is substantially similar to a diameter of the first opening at the distal end. The first opening is wider than the second opening.

The first portion of the wall is substantially cylindrical in shape and includes the first opening at the surface of the plate and the first opening at the distal end. The second portion of the wall is conical in shape, tapering from the first opening toward the second opening.

The first portion of the wall includes a length, between the first opening at the surface of the plate and the first opening at the distal end, having a value of 1–10 times a diameter size of the first opening. The second portion of the wall includes a length, between the first opening at the distal end and the second opening, having a value of ¼–⅓ times the diameter size of the first opening.

In another embodiment, the microchannel includes a third portion of the wall, which extends longitudinally from the second opening toward a third opening at a still further distal end. The second opening and the third opening have a substantially similar cross sectional diameter size.

In yet another embodiment, the microchannel includes a fourth portion of the wall, which extends longitudinally from the third opening and tapers toward a fourth opening at yet a further distal end. The fourth opening has a narrower cross sectional diameter size than the third opening.

The invention also includes a method of making a microchannel plate for an image intensifier tube.

It is understood that the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures.

DETAILED DESCRIPTION OF THE INVENTION

In accordance with the present invention, a microchannel plate (MCP) having deep funneled openings and/or step funneled openings overcomes the disadvantages caused by metallization of exposed microchannels at the input side or output side of the MCP. By moving the funnel deeper into the MCP microchannel (or further away from the input/output side), performance of the MCP is enhanced and not degraded by any metallization process. Incident electrons are less likely to encounter metal coatings in a deep funnel channel, as they may in a fully straight channel of a similar diameter.

In addition, although the deep funnel channel has a wider diameter than either a non-funneled channel or a basic-funneled channel (basic-funnel disclosed in U.S. Pat. No. 6,311,001), the deep funnel channel retains sufficient wall thickness along most of its length (for example 90% of its length) and provides strength and rigidity to the MCP.

Figure 1B:
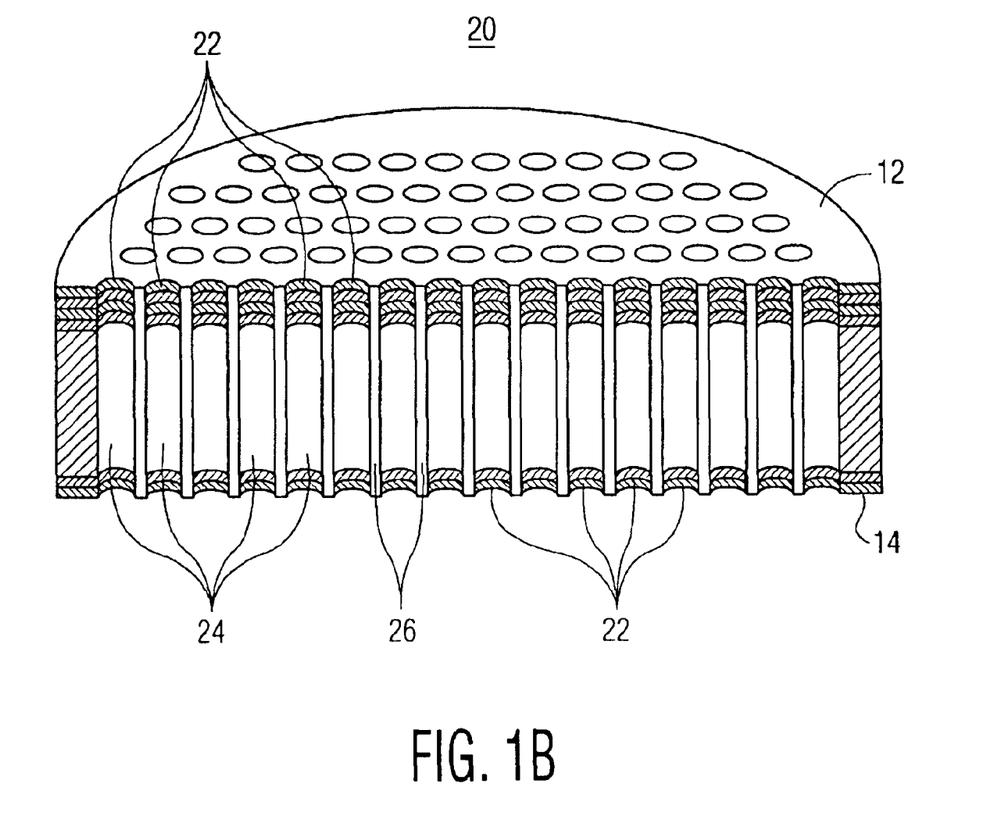
FIG. 1B is a sectional view of a microchannel plate made according to an embodiment of the invention.

Referring to FIG. 1B, there is shown a sectional view of MCP 20, formed in accordance with an embodiment of the invention. FIG. 1B depicts microchannels 24 extending between input side 12 (electron receiving side) and output side 14 (electron discharge side). Each microchannel wall 26 is tubular in structure and forms each microchannel 24. The microchannel walls also separate the microchannels from one another.

As shown, microchannel wall 26 is substantially cylindrical in shape forming a continuous opening from the input side to the output side. As will be explained, microchannel 24 may include multiple portions or regions 22 at the input side only, output side only or both input and output sides (as shown). The multiple portions or regions shown in FIG. 1B are not drawn to scale, but are exaggerated for discussion purposes. These regions, as explained, provide improvements over conventional funneled openings 18 of FIG. 1A. These regions form a deep funnel and/or a step funnel, in accordance with embodiments of the invention.

Figure 3A:
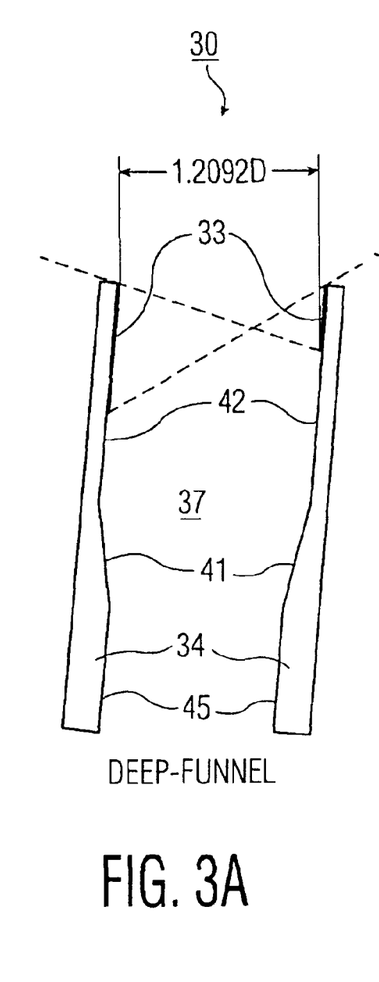
FIGS. 3A–3C are sectional views of two embodiments of the invention, each depicting a portion of a microchannel, arranged side-by-side, for comparison purposes, with a conventional microchannel depicting a basic-funnel.
Figure 3B:
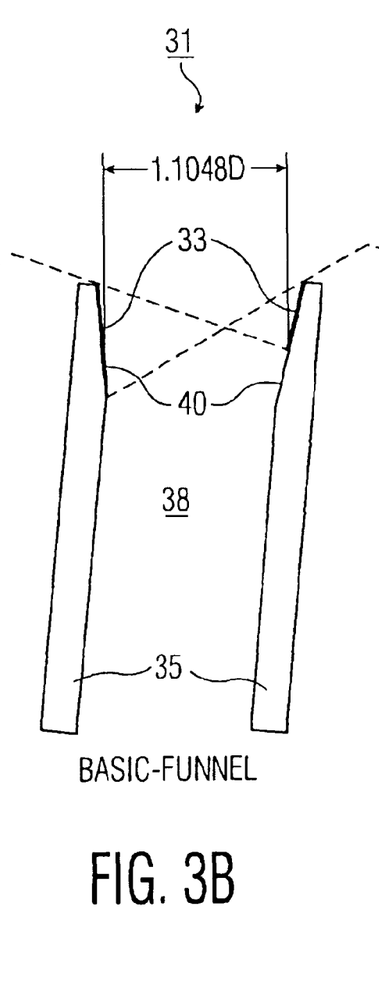
Figure 3C:
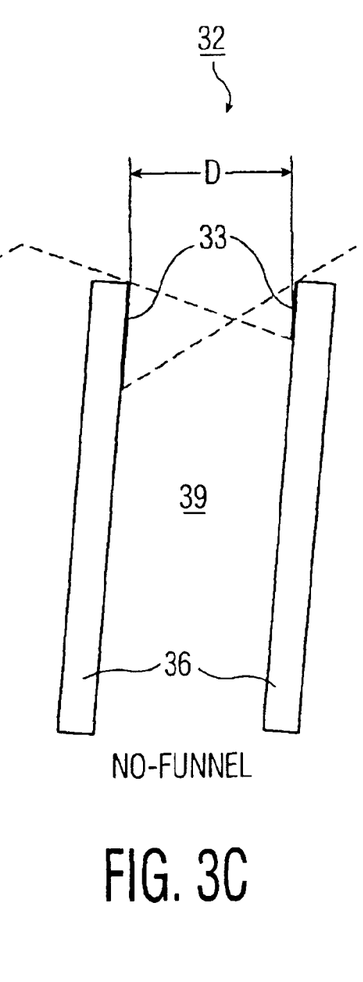

Referring now to FIGS. 3A–3C, there is shown different microchannels formed in an MCP. More specifically, MCP 30 includes microchannel 37 (FIG. 3A), MCP 31 includes microchannel 38 (FIG. 3B) and MCP 32 includes microchannel 39 (FIG. 3C). It will be appreciated that only the input sides of microchannels 37, 38 and 39 are shown. A similarly shaped microchannel may be included at the output side of each MCP.

FIG. 3C shows microchannel 39 including a straight tubular wall 36 (no-funnel) having an effective diameter of D microns. Also shown is metallization coverage 33, which may be deposited adjacent the input side of MCP 32. The dashed lines represent resulting paths of metallization deposition that impinges on the interior surface of tubular wall 36.

FIG. 3B shows microchannel 38 including straight tubular wall having funneled region 40 (basic-funnel). Microchannel 38 has an effective diameter wider than the effective diameter of microchannel 39 (for example 1.1048 D). Metallization coverage 33, which may be deposited (dashed lines) on funneled region 40, is also shown.

FIG. 3A shows MCP 30 including a deep funnel, in accordance with an embodiment of the present invention. As shown, MCP 30 includes microchannel 37 having tubular wall 34. At the input side of MCP 30, wall 34 includes upper straight-walled region or portion 42 (a first portion), funneled-region or portion 41 (a second portion), and lower straight-walled region or portion 45 (a third portion). Microchannel 37 has an effective diameter wider than the effective diameter of the basic-funnel (for example 1.2092 D). As may be seen, the effective diameter of the deep funnel channel is wider than the basic-funnel for the same physical channel opening size. Metallization coverage 33, which may be deposited (dashed lines) on upper straight-walled region 42, is also shown.

Figure 4:
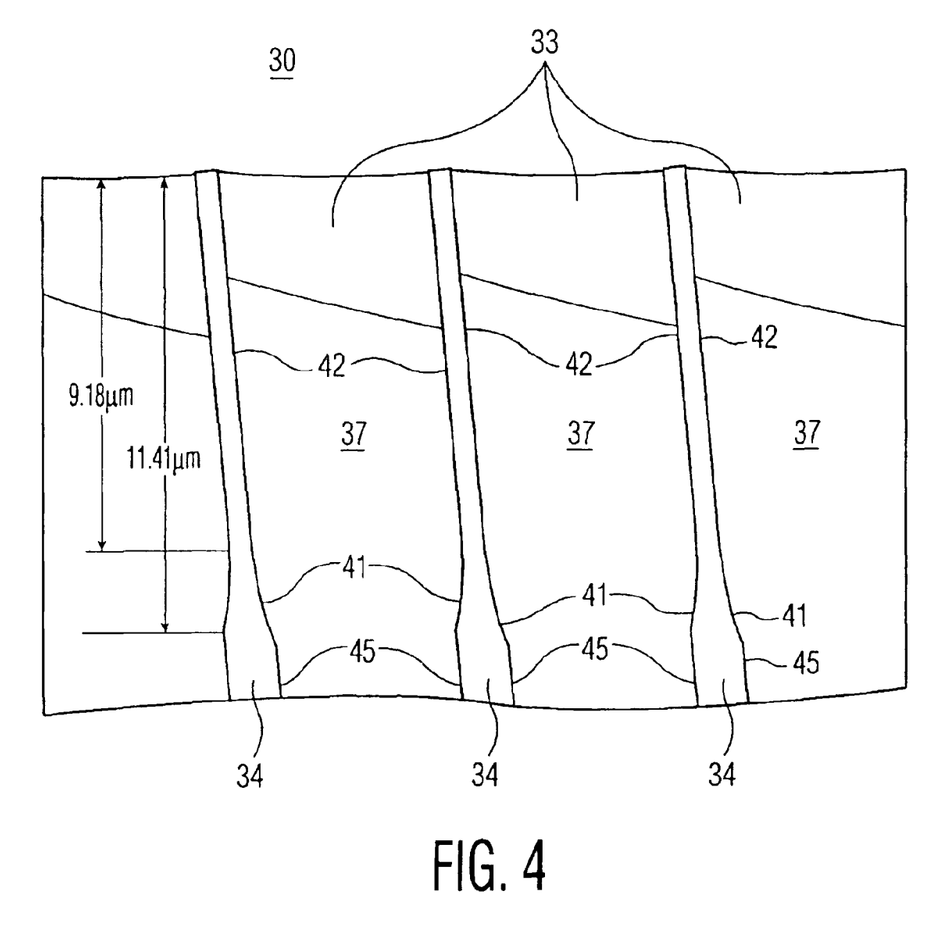
FIG. 4 is an electron micrograph depicting a sectional view of a portion of a microchannel plate employing a deep-funnel in each microchannel, in accordance with an embodiment of the invention.

Referring now to FIG. 4, there is shown MCP 30 including deep funnel microchannels 37 (at the input side). A deep funnel microchannel includes upper (proximate) straight-walled portion 42 (first portion), funneled-portion 41 (second portion) and lower (distal) straight-walled portion 45 (third portion). The upper (proximate) straight-walled portion has a maximum diameter and the lower (distal) straight-walled portion has a narrower diameter. It will be appreciated that these portions are reversed at the output side of MCP 30 (not shown).

The upper straight-walled portion extends from 1–10 channel diameters into the microchannel. This portion has the metallization deposited on it (shown as 33). The depth of this portion may be selected based on processing times.

The funneled-portion is ¼–⅓ channel diameters long and forms a transition from the wider diameter to the narrower diameter. If this portion is located in the electron impact area, there may be additional benefit to secondary electron emission from a less-oblique impact angle.

Distally, beyond the funneled portion, is a standard microchannel portion. This portion includes straight tubular walls and provides multiplication of the electrons collected by the microchannel. This distal portion, which provides structural strength for the plate, is 40–70 microchannel diameters long. These portions may be repeated, in reverse order, at the output end of the microchannel.

As shown in FIG. 4 (for example), the upper straight-walled portion is 9.18 microns in length and the funneled-portion is 2.23 microns in length.

Figure 5:
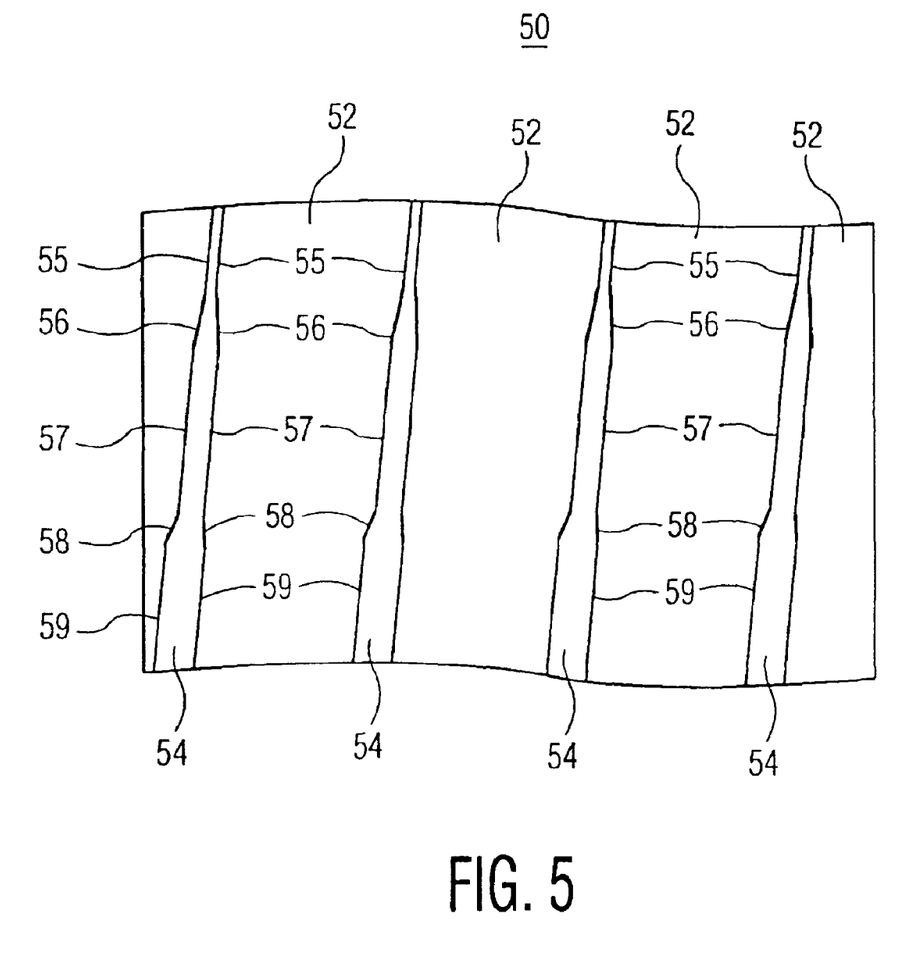
FIG. 5 is an electron micrograph depicting a sectional view of a portion of a microchannel plate employing a step-funnel in each microchannel, in accordance with another embodiment of the invention.

Referring now to FIG. 5, there is shown microchannels formed in a step-funneled geometry, in accordance with another embodiment of the invention. As shown, MCP 50, at the input side, includes microchannels 52. Wall 54 of each microchannel is similar to the deep-funneled geometry of wall 34 shown in FIG. 4, except that wall 54 includes multiple funneled portions.

As shown, wall 54 includes a first proximate straight-walled portion 55, a second straight-walled portion 57 and a third (distal) straight walled portion 59. Forming a transition between the first straight-walled portion and the second straight-walled portion is funneled portion 56. Distally, forming a transition between the second straight-walled portion and the third straight-walled portion is another funneled region 58. The spacing between funneled portions may be selected based on processing times.

As discussed in U.S. Pat. No. 6,311,001, it will be understood that the microchannels shown in FIGS. 2–5 are angled between 3° to 20° (typically about 10°), as measured with respect to a normal axis projected from the input side of the MCP.

The method of fabricating the MCP, which is described in U.S. Pat. No. 6,311,001, is incorporated herein by reference. As described therein, the MCP is fabricated from two different glass compositions, namely an acid resistant matrix glass (clad), and an acid etchable core glass. The core rod occupies the space that becomes the microchannel. The core rod is partially dissolved in acid solution at the beginning of chemical processing. A sodium hydroxide leach step attacks the exposed core/clad interface due to high chemical or mechanical stress in that region. For a non-funneled MCP, the sodium hydroxide contacts the interface zone throughout the length of the microchannel and results in an overall change in channel diameter. In the basic-funneled MCP, this interface zone in exposed only at the ends of the channel (since the core rod is still in place), and the tapered funnel occurs at the extreme end of the channel.

The core rod is slowly dissolved starting at one end (or both ends). The MCP may be removed from this solution at any time and rinsed to stop the etching reaction with any desired amount of core rod remaining. After such a partial decore, the sodium hydroxide removes interface material from the channel everywhere the core rod has been removed, as well as etching slightly past the core rod in the same manner as the basic-funnel. The amount of wall removal is dependent on the time of NaOH exposure, as well as its concentration, temperature, and flow rate. After the removal of all remaining core rod, the resulting geometry is the deep funnel.

The partial decore and leach steps may be repeated any number of times. Each cycle creates a small discontinuity in the channel wall corresponding in depth to the decore time, and in diameter to the NaOH leaching time. This multi-cycle processing forms the step funnel.

Those persons skilled in MCP fabrication art may adjust one or more of these parameters to adapt the funneling process to fabricate a MCP with the desired characteristics.

The deep funnel process, like the basic funnel process, inherently processes both input and output ends of the channel symmetrically. There may be advantages to asymmetric channel ends (e.g. electron focusing desired on the output). This may be achieved by masking off each face of the MCP during funnel processing and using different funnel processing times. Masking may be performed with o-ring seals, photoresist, plating tape, wax, etc.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention. For example, any microchannel plate may be formed with the deep funnel and/or step funnel, if the glass system exhibits a stress field at the core/clad interface.

What is claimed:

1. A microchannel plate for an image intensifier tube, in which the plate includes a plurality of microchannels extending in a longitudinal dimension between transverse surfaces of the plate, a microchannel comprising:

a first portion forming a first opening proximate a surface of the plate, the first portion including a wall extending longitudinally from the surface and terminating in a substantially similar first opening at a distal end, and a second portion, including said wall, extending longitudinally from the first opening at the distal end and tapering toward a second opening at a further distal end, the first opening being wider than the second opening, a third portion, including said wall, extending longitudinally from the second opening toward a third opening at a still further distal end, the second opening and the third opening having a substantially similar cross sectional size, and a fourth portion, including said wall, extending longitudinally from the third opening and tapering toward a fourth opening at yet a further distal end, the fourth opening having a narrower cross sectional size than the third opening.

2. The microchannel plate of claim 1 in which the first portion is substantially cylindrical in shape, including the first opening at the surface of the plate and the first opening at the distal end having a substantially similar diameter, and the second portion is conical in shape, tapering from the first opening toward the second opening.

3. The microchannel plate of claim 1 in which the surfaces of the plate include input and output surfaces for receiving and discharging electrons through the microchannel, and the first portion is formed adjacent at least one of the input surface and the output surface.

4. The microchannel plate of claim 1 in which the wall is formed by a clad layer of a glass fiber, and the first and second openings are formed by a partial removal of the clad layer.

5. The microchannel plate of claim 1 in which a length of the first portion, between the first opening at the surface of the plate and the first opening at the distal end, has a value of 1–10 times a diameter size of the first opening, and a length of the second portion, between the first opening and the second opening has a value of ¼–⅓ times the diameter size of the first opening.

6. A method of making a microchannel plate having a plurality of microchannels for receiving and discharging electrons, the method comprising the steps of:

(a) providing a plurality of glass fibers, each fiber having an acid etchable core and an acid resistant cladding;

(b) forming the glass fibers into a thin plate;

(c) dissolving a portion of the acid etchable core of the thin plate in an acid solution for a first predetermined time;

(d) leaching a portion of the acid resistant cladding of the thin plate in an alkaline solution for a second predetermined time; and (e) varying the first predetermined time and the second predetermined time to form a deep funnel in a microchannel.

7. The method of claim 6 including the following steps:

(f) removing the thin plate after dissolving the portion in the acid solution; and (g) rinsing the thin plate immediately after removing the thin plate in step (f) to stop dissolving another portion of the acid etchable core.

8. The method of claim 7 including the following step:

(h) repeating steps (c) through (f) to form a step funnel in the microchannel.

9. The method of claim 6 wherein the dissolving step includes bathing the thin plate in a solution containing a compound selected from a group consisting of hydrochloric acid, hydrofluoric acid, nitric acid, sulfuric acid and other mineral acids.

10. The method of claim 6 wherein the leaching step includes bathing the thin plate in a solution containing a compound selected from a group consisting of ammonium hydroxide, potassium hydroxide, sodium hydroxide, and other alkali metal hydroxides.

11. The method of claim 6 wherein the steps of dissolving and leaching includes masking one of an electron receiving side and an electron discharging side of the thin plate with a chemical resistant tape or film, and dissolving and leaching the other side of the thin plate.

* * * * *